United States Patent [19]

Tsukamoto

[11] Patent Number: 4,973,079
[45] Date of Patent: Nov. 27, 1990

[54] ACTIVELY CONTROLLED SUSPENSION SYSTEM WITH WORKING FLUID CIRCUIT PERFORMING FAIL-SAFE OPERATION IN RESPONSE TO FAILURE OF CONTROL

[75] Inventor: Masahiro Tsukamoto, Kanagawa, Japan

[73] Assignee: Nissan Motor Company, Limited, Yokohama, Japan

[21] Appl. No.: 310,130

[22] Filed: Feb. 15, 1989

[30] Foreign Application Priority Data

Feb. 19, 1988 [JP] Japan .................................. 63-37030

[51] Int. Cl.$^5$ ............................................. B60G 17/01
[52] U.S. Cl. ..................................... 280/707; 280/714
[58] Field of Search ................ 280/707, 714; 188/299; 364/424.05

[56] References Cited

FOREIGN PATENT DOCUMENTS

| | | | |
|---|---|---|---|
| 3638574 | 5/1988 | Fed. Rep. of Germany. | |
| 59-99138 | 6/1984 | Japan | 280/707 |
| 59-137641 | 8/1984 | Japan | 280/707 |
| 61-36010 | 2/1986 | Japan | 280/707 |
| 61-215105 | 9/1986 | Japan | 280/707 |
| 62-283010 | 12/1987 | Japan | 280/707 |

Primary Examiner—Charles A. Marmor
Assistant Examiner—Karin Tyson
Attorney, Agent, or Firm—Foley & Lardner, Schwartz, Jeffery, Schwaab, Mack, Blumenthal & Evans

[57] ABSTRACT

An actively controlled suspension system includes a fluid circuit connecting a fluid pressure source and a working chamber of a working cylinder disposed between a vehicle body and a suspension member. The fluid circuit includes a pressure control valve which is connected to an electric control system to be controlled valve position by an electric control signal for controlling fluid pressure in the working chamber. The fluid circuit also includes a fail-safe valve which normally forms part of fluid path of the fluid circuit is responsive to a fail-safe signal generated in the control system to take place fail-safe operation for setting the fluid pressure in the working chamber at a predetermined pressure.

12 Claims, 6 Drawing Sheets

ACTIVELY CONTROLLED SUSPENSION SYSTEM WITH WORKING FLUID CIRCUIT PERFORMING FAIL-SAFE OPERATION IN RESPONSE TO FAILURE OF CONTROL

BACKGROUND OF THE INVENTION

1. Field of the Invention

The present invention relates generally to an actively controlled suspension system which controls suspension characteristics or stiffness of suspension system of an automotive vehicle for regulating vehicular height, an absorbing road shock and suppressing vehicular attitude change. More specifically, the invention relates to a fluid circuit for the actively controlled suspension system which assures safety even when a control system controlling the suspension system fails.

2. Description of the Background Art

U.S. Pat. No. 4,702,490, issued on Oct. 27, 1987, the co-pending U.S. patent applications Ser. Nos. 052,934, 059,888, 061,368, 060,856 and 060,909 respectively filed on May 22, 1987, June 9, 1987, June 15, 1987, June 12, 1987 and June 12, 1987, and commonly assigned to the assignee of the present invention, propose actively controlled suspension systems which generally achieve vehicular height regulation for maintaining vehicular height level at a predetermined height range and, as well, achieve attitude change suppression for better driving stability and riding comfort. Such actively controlled suspension systems employs proportioning valve assemblies in a pressure circuit for adjusting fluid pressure in a working chambers defined within working cylinders disposed between vehicular bodies and suspension members rotatably supporting vehicular wheels.

Generally, the proportioning valve assembly employed in the foregoing U.S. Patent, and the co-pending U.S. patent applications, is disposed within a hydraulic circuit connecting a pressurized working fluid source unit and the working chamber. The proportioning valve assembly comprises a three way spool valve or poppet valve which is supplied substantially constant line pressure from the pressurized working fluid source and output adjusting pressure controlled by an electric actuator, such as an electrically driven proportioning solenoid and so forth. The actuator operates to adjust a pilot pressure to be exerted on the pressure controlling valve, such as the spool valve or poppet valve. A pilot chamber in which the pilot pressure is generated, is selectively connected to a control port connected to the working chamber of the working cylinder to receive therefrom the control pressure to be supplied to the working chamber as feedback pressure, and to a drain port for draining pressure to the pressurized working fluid source via a drain line.

The proportioning valve is associated with an electric control circuit including a microprocessor for processing control parameter indicative sensor signals for deriving a control signal value. The control circuit also includes a driver circuit receiving the control signal and producing a driver current which is variable of current value for adjusting the valve position and whereby adjusting the fluid pressure in the working chamber of the working cylinder.

As will be appreciated, the proportioning valve assemblies are provided for respective working cylinders disposed in front-left, front-right, rear-left and rear-right suspension systems which are mutually distanced in substantial length. This results in requirement of relatively long wirings for distributing control signals or driver current. Such wirings constantly subject vibrations while vehicle is running and thus tend to cause disconnection at connecting portion or to cause breakage. Such failure of wiring or control circuit causes drop out of the driver current for the proportioning valve assembly to cause unstability of the vehicular attitude. Particularly, for the type of the actively control system which is designed for controlling fluid pressure in respective working cylinder irrespective to the others, failure of wiring for one proportioning valve assembly may cause substantial variation of the vehicular attitude for making the vehicle substantially unstable condition.

SUMMARY OF THE INVENTION

Therefore, it is an object of the present invention to provide an actively controlled suspension system which assures safety and stability vehicular attitude even when an electric control system fails.

Another object of the invention is to provide an actively controlled suspension system which incorporates a fail-safe valve provided in series with a pressure control valve for fail-safe operation.

In order to accomplish aforementioned and other objects, an actively controlled suspension system, according to the present invention, includes a fluid circuit connecting a fluid pressure source and a working chamber of a working cylinder disposed between a vehicle body and a suspension member. The fluid circuit includes a pressure control valve which is connected to an electric control system to be controlled valve position by an electric control signal for controlling fluid pressure in the working chamber. The fluid circuit also includes a fail-safe valve which normally forms part of fluid path of the fluid circuit and is responsive to a fail-safe signal generated in the control system to take place fail-safe operation for setting the fluid pressure in the working chamber at a predetermined pressure.

According to one aspect of the invention, an actively controlled suspension system comprising:

- a cylinder disposed between a vehicle body and a suspension member which rotatably support a road wheel, the cylinder defining a variable pressure working chamber filled with a pressure medium for generating a damping force resisting against relative displacement between the vehicle body and the suspension member;
- a fluid circuit means connected to the working chamber for supplying pressure medium fluid and including a pressure source feeding pressurized pressure medium fluid through the circuit;
- a pressure control valve disposed between the pressure source and the working chamber and variable of valve position between a first mode for increasing pressure of the pressure medium within the working chamber, a second mode for decreasing pressure in the pressure within the working source, and a third mode for maintaining the pressure in the pressure medium constant;
- a sensor means for monitoring vehicle body attitude change for producing a vehicle body attitude change indicative sensor signal;
- a control circuit for deriving a control signal on the basis of the vehicle body attitude change indicative signal for operating the pressure control valve to one of the first, second and third mode to adjust the pressure of the pressure medium in the working chamber for suppressing attitude change of the vehicle body;

a detector means detecting the control circuit in failure to produce a fail detection signal; and a fail-safe means responsive to the fail detection signal for adjusting the fluid pressure in the working chamber irrespective of the position of the pressure control valve means.

In the preferred embodiment, the fluid circuit means comprises a supply line for supplying the pressurized pressure medium fluid, a drain line for recirculating the pressure medium fluid to a pressure source and a pressure control line connecting the pressure control valve means and the working fluid, and the fail-safe means includes means for setting line pressure in the drain line at a pressure higher than or equal to a predetermined pressure level. The line pressure setting means is provided the predetermined pressure level at a pressure corresponding to a predetermined neutral pressure in the working chamber, at which neutral suspension characteristics is obtained. On the other hand, the fail-safe means may comprise a first fluid path means which is normally active for serving as part of the pressure control line and a second fluid path means by-passing the pressure control line and directly connecting the working chamber to supply and drain lines while the fail detection signal is present. The fail-safe means including means switching a state between a first normal mode, in which the first path means is active, and a second fail-safe mode, in which the second path means is active, the switching means normally selecting the first normal mode and responsive to the fail detection signal to select the second fail-safe mode. The detector means monitors value of the control signal applied to the pressure control valve means to detect the control signal value smaller than a given value to produce the fail detection signal.

According to another aspect of the invention, an actively controlled suspension system comprising:

a cylinder disposed between a vehicle body and a suspension member which rotatably support a road wheel, the cylinder defining a variable pressure working chamber filled with a pressure medium for generating a damping force resisting against relative displacement between the vehicle body and the suspension member;

a fluid circuit means connected to the working chamber for supplying pressure medium fluid and including a pressure source feeding pressurized pressure medium fluid through the circuit;

a pressure control valve disposed between the pressure source and the working chamber and variable of valve position between a first mode for increasing pressure of the pressure medium within the working chamber, a second mode for decreasing pressure in the pressure within the working source, and a third mode for maintaining the pressure in the pressure medium constant;

a sensor means for monitoring vehicle body attitude change for producing a vehicle body attitude change indicative sensor signal;

a control circuit for deriving a control signal on the basis of the vehicle body attitude change indicative signal for operating the pressure control valve to one of the first, second and third mode to adjust the pressure of the pressure medium in the working chamber for suppressing attitude change of the vehicle body;

a detector means detecting the control signal having a value smaller than a given value to produce a fail detection signal; and a fail-safe means, including fluid path means by-passing the pressure control valve means and a fail-safe valve, for normally establishing fluid communication between the pressure control valve means and the working chamber and responsive to the fail detection signal for blocking fluid communication between the pressure control valve and the working chamber and establishing fluid communication between the working chamber and the fluid path means by-passing the pressure control valve means.

The fail-safe valve may comprise a two way valve including an electromagnetic actuator operable between a first energized state and a second deenergized state for operating the fail-safe valve between a first mode, in which fluid communication between the pressure control valve and the working chamber is established and fluid communication between between the working chamber and the fluid path means is blocked, and a second mode, in which fluid communication between the pressure control valve and the working chamber is blocked and fluid communication between the fluid path means and the working chamber is established.

In the preferred construction, the fail-safe valve comprising:

a valve housing defining a first port connected to a pressurized working fluid source to receive pressurized working fluid therefrom, a second port connected to the pressurized working fluid source for returning the working fluid thereto, a third port connected to the pressure control valve means, and fourth port connected to the working chamber for fluid communication therewith for adjusting working fluid pressure in the work;

a first valve body having one end facing a first chamber to be exerted a pilot pressure representative of a desired pressure in the work and the other end facing a second chamber to be exerted a feedback pressure which is fed back from the third port, the first valve body being movable between a first position corresponding to the first mode and at which fluid communication between the pressure control valve and the working chamber is established and fluid communication between between the working chamber and the fluid path means is blocked, and a second position corresponding to the second mode and at which fluid communication between the pressure control valve and the working chamber is blocked and fluid communication between the fluid path means and the working chamber is established, the first valve body being normally biased toward the second position with a given force;

a fluid path means defining a fluid path extending from the first port to the first chamber and from the first chamber to the second port;

a second valve means associated with the fluid path and movable between a first position for providing flow restriction at a predetermined first magnitude for generating the pilot pressure overcoming the given force and a second position for providing flow restriction at a predetermined second magnitude for generating pilot pressure which is smaller than the given force; and an electrically operable actuator associated with the second valve means for normally positioning the valve body at the first position and responsive to the fail detection signal for driving the valve body to the second position.

BRIEF DESCRIPTION OF THE DRAWINGS

The present invention will be understood from the detailed description given herebelow and from the accompanying drawings of the preferred embodiments of the invention, which, however, should not be taken for limiting the invention to the specific embodiments, but are for explanation and understanding only.

In the drawings.

DESCRIPTION OF THE PREFERRED EMBODIMENT

Figure 1:
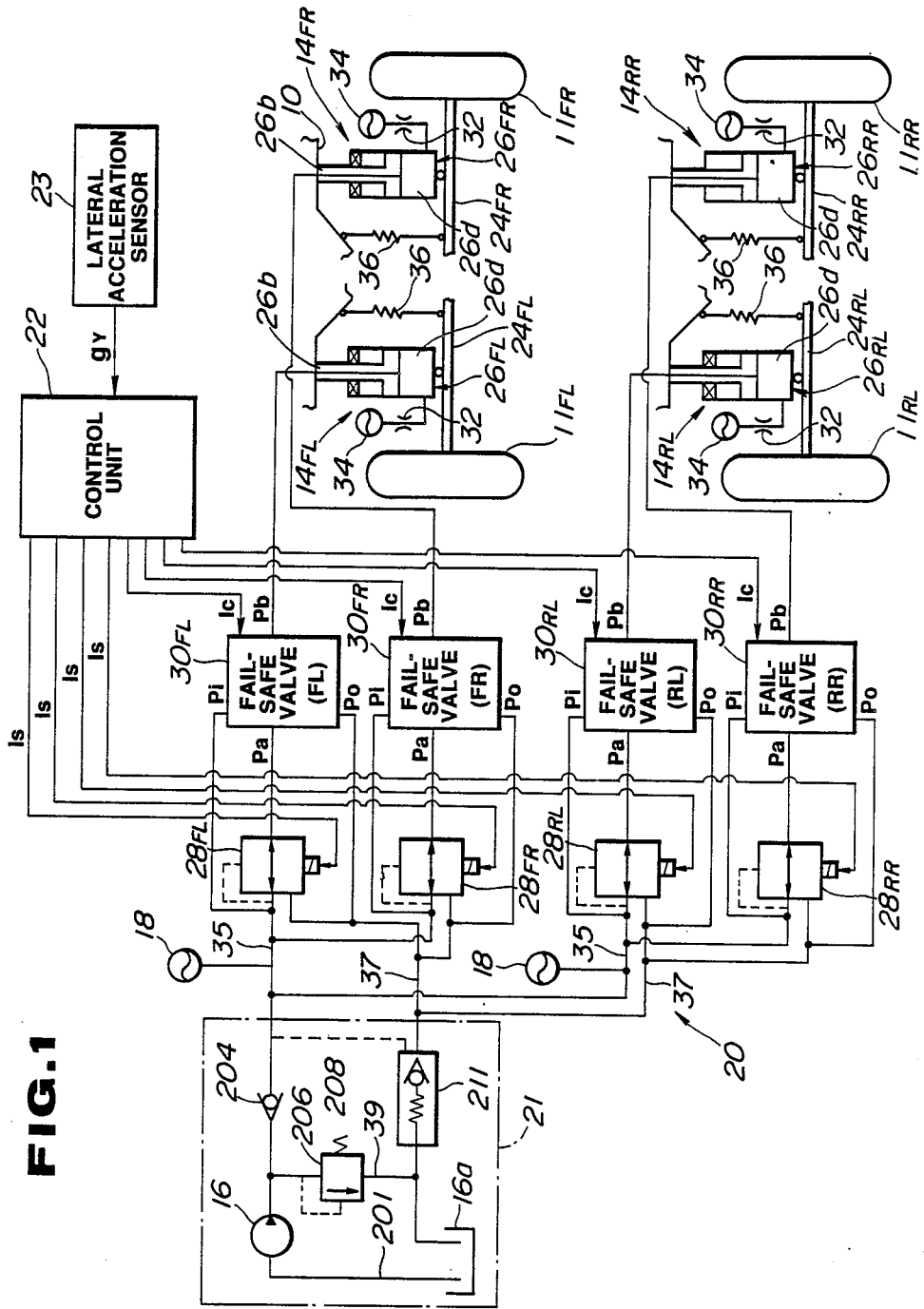
FIG. 1 is a diagrammatical illustration of the overall construction of the preferred embodiment of an actively controlled suspension system, according to the present invention, in which the preferred embodiment of a fail-safe system implementing the preferred process of fail-safe operation according to the invention.

Referring now to the drawings, particularly to FIG. 1, the preferred embodiment of an actively controlled suspension system, according to the present invention, is designed to generally perform suspension control for regulating vehicular height level and vehicular attitude by suppressing relative displacement between a vehicular body 10 and suspension members 24FL, 24FR, 24RL and 24RR provided in front-left, front-right, rear-left and rear-right suspension mechanism 14FL, 14FR, 14RL and 14RR and rotatably supporting front-left, front-right. rear-left and rear-right wheels 11FL, 11FR, 11RL and 11RR. The suspension member will be hereafter represented by the reference numeral "24" as generally referred to. Similarly, the suspension mechanism as generally referred to will be hereafter represented by the reference numeral "14" Respective front-left, front-right, rear-left and rear-right suspension mechanisms 14FL, 14FR, 14RL and 14RR have hydraulic cylinders 26FL, 26FR, 26RL and 26RR which will be represented by the reference numeral "26" as generally referred to.

Each of the hydraulic cylinder 26 is disposed between the vehicular body 10 and the suspension member 24 to produce a damping force for for absorbing road shock so as to avoid rough ride feeling and for suppressing relative displacement between the vehicular body and the suspension member in order to prevent the vehicular body from changing attitude. The hydraulic cylinder 26 generally comprises an essentially enclosed cylindrical cylinder body 26a defining therein an enclosed chamber. A thrusting piston 26c is thrustingly and slidably disposed within the enclosed chamber of the hydraulic cylinder 26 for defining in the latter a working chamber 26d and a reference pressure chamber 26e. The working chamber 26d may be communicated with the reference pressure chamber 26e via an orifice formed through the piston for fluid communication therebetween in an substantially restricted amount. The piston 26c is connected to the associated one of suspension member 24 via a piston rod 26b. A suspension coil spring 36 employed in the shown type of the suspension system is not required a resilient force in a magnitude required in the ordinary suspension system and only required the resilient force necessary for maintaining the vehicular body about the suspension member.

The working chamber 26d of the hydraulic cylinder 26 is connected one of pressure control valves 28FL, 28FR, 28RL and 28RR via a pressure control line 38. The pressure control valve 28FL, 28FR, 28RL and 28RR will be hereafter represented by the reference numeral "28" as generally referred to. The pressure control valve 28 is, in turn, connected to a pressure source unit 21 via a supply line 35 and a drain line 37. A circuit is provided for connecting the working chamber 26d to a pressure accumulator 34 via a flow restricting means, such as an orifice 32. Another pressure accumulator 18 is provided in the supply line 35 for accumulating the excessive pressure generated in the pressure source unit 21.

The pressure control valves 28 comprise, though it is not clearly shown in FIG. 1, electrically or electromagnetically operable actuators (reference is made to FIG. 2), such as a proportioning solenoids. The actuators are connected to a microprocessor based control unit 22. The control unit 22 is connected a lateral acceleration sensor 23 which monitors lateral acceleration exerted on the vehicle body 10 to produce a lateral acceleration indicative signal $g_y$. Based on the lateral acceleration indicative signal $g_y$ generated by the lateral acceleration sensor 23, the control unit performs anti-rolling.

It should be appreciated, though the shown embodiment of the actively controlled suspension system has been illustrated in simplified form to perform only anti-rolling suspension control, the practically implemented system may includes various sensors for monitoring suspension control parameters, such as longitudinal acceleration, vertical displacement magnitude and so forth for completing suppression of attitude change not only in rolling direction but also pitching and yawing directions, and for performing vehicular height regulation.

Figure 2:
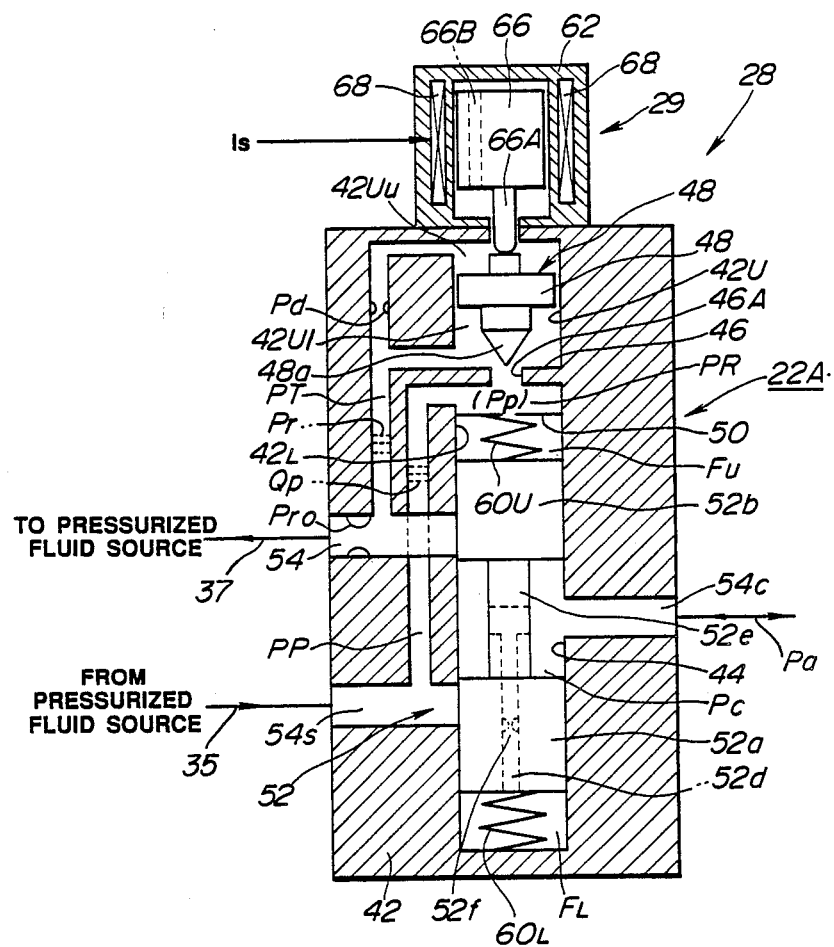
FIG. 2 is a sectional view of the preferred embodiment of a pressure control valve according to the present invention.

As shown in FIG. 2 in detail, the pressure control valve 28 comprises a proportioning valve assembly and is designed to be controlled by an electric current as a control signal supplied from the control unit 22 for varying valve position according to variation of the current value of the control signal. Generally, the pressure control valve 28 controls magnitude of introduction and draining of pressurized fluid into and from the working chamber 26d for adjusting the pressure in the working chamber. As will be appreciated, since the adjusted fluid pressure in the working fluid determines damping force to be created in response to relative displacement between the vehicle body 10 and the suspension member 24. Mode of the suspension mechanism is varied according to variation of the fluid pressure in the working chamber between a predetermined hardest mode to most soft mode.

In the construction of the pressure control valve shown in FIG. 2, the pressure control valve 28 includes a valve housing 42. The valve housing 42 defines a valve bore 44 which is separated in to a valve chamber 42L and a control chamber 42U by means of a partitioning wall 46. The partitioning wall 46 is formed with a communication path opening 46A for communication between the control chamber 42U and the valve chamber 42L. As seen from FIG. 2, the control chamber 42U and the valve chamber 42L are arranged in alignment to each other across the communication path opening 46A. In parallel to a section of the partitioning wall 46 extending perpendicular to the axis of the valve chamber 42L and the control chamber 42U, a fixed orifice defining partitioning member 50 is provided. The partitioning member 50 defines a throttling orifice which is oriented substantially in alignment with the communication path opening 46A. The partitioning wall 46 and the partitioning member 50 are cooperative for defining a pilot chamber PR therebetween.

A valve spool 52 is thrustingly and slidingly disposed within the valve chamber 42L. The valve spool 52 defines an upper feedback chamber FU between the tip end thereof and the partitioning member 50. The valve spool 52 also defines a lower feedback chamber FL between the other tip end thereof and the bottom of the valve chamber 42L. Offset springs 60U and 60L are disposed within the upper and lower feedback chambers FU and FL, which offset springs exerts spring force to the valve spool 52 for resiliently restricting movement of the latter. Resilient force of the offset springs 60U and 60L are so set as to balance to place the valve spool 52 at a neutral position, when the fluid pressure in the upper and flow feedback chambers FU and FL balances to each other. The valve chamber 42L is communicated with a supply line 35 via an supply port 54s, a drain line 37 via a drain port 54r and a pressure control line 38 via a control port 54c, which supply port, drain port and control port are defined in the valve housing 42. The valve spool 52 at the aforementioned neutral position, blocks fluid communication of the pressure control chamber PC with any of the supply port 54s and the drain port 54r. As a result, as long as the valve spool 52 is maintained at the neutral position, overall fluid force in the hydraulic circuit downstream of the pressure control valve, which circuit includes the working chamber 26d of the hydraulic cylinder 26 is held constant.

The valve spool 52 is formed with lands 52a and 52b connected to each other via smaller diameter bar-like section 52e. The land 52a is oriented adjacent the lower feedback chamber FL so as to subject the tip end to the fluid pressure in the lower feedback chamber. Similarly, the land 52b is oriented adjacent the upper feedback chamber FU so as to subject the tip end to the fluid pressure in the upper feedback chamber. The bar-like section 52e between the lands 52a and 52b is cooperative with the peripheral wall of the valve chamber 42L in order to define therebetween a pressure control chamber PC. A fluid flow path 52d is formed through the valve spool 52. The fluid flow path 52d has one end communicated with the pressure control chamber PC and the other end communicated with the lower feedback chamber FL. A fixed flow restricting orifice 52f is formed in the fluid flow path 52d for restricting fluid flow therethrough.

A poppet valve member 48 is disposed within the control chamber 42U for thrusting movement therein. The poppet valve member 48 has a valve head 48a of an essentially conical configuration. The valve head 48a opposes to the communication path opening 46A of the partitioning wall 46. The poppet valve member 48 is operably associated with a proportioning solenoid assembly 29 as the actuator. The proportioning solenoid assembly 29 comprises a housing 62 rigidly secured on the valve housing 42 and defining an internal space to receive therein a plunger 66. The plunger 66 has a plunger rod 66A. The tip end of the plunger rod 66A is kept in contact with the tip end of the poppet valve member 48 remote from the valve head 48a. Therefore, the poppet valve member 48 is axially driven by means of the plunger 66 to control the path area in the communication path opening 46A according to the position of the tip end of the plunger rod 66A. Adjusting of the path area in the communication path opening 46A results in variation of fluid pressure to be introduced into the pilot chamber PR.

In order to control the position of the plunger 66 with the plunger rod 66A, a proportioning solenoid coil 68 is housed within the housing 62 and surrounds the plunger 66. The interior space of the housing 62 is connected to the control chamber 42U for fluid communication therebetween. The plunger 66 is formed with a fluid path 66B for fluid communication between upper and lower sections of the interior space. Therefore, the fluid pressure in the upper and lower sections of the interior space of the housing 62 is held equal to the pressure in the control chamber 42U. This cancels fluid pressure to be exerted on the poppet valve and the plunger so that the position of the tip end of the plunger rod 66A can be determined solely depending upon the magnitude of energization of the proportioning solenoid coil 68.

As seen from FIG. 2, the poppet valve member 48 has a cylindrical larger diameter section 48b for separating the control chamber 42U into upper section and lower section 42Uu and 42Ul. The upper and lower sections 42Uu and 42Ul are communicated with the drain port 54r via a pilot return path PT. A multi-stage orifice Pr is provided in the pilot return path PT for restricting fluid flow therethrough. The multi-stage orifice Pr comprises a plurality of strips formed with through openings and is so designed that one of the orifice oriented at most upstream side is mainly effective for restricting fluid flow when fluid flowing therethrough is steady flow and that all of the orifices of respective strips are equally effective for restricting fluid flow when fluid flow therethrough is disturbed and not steady. Therefore, as will be appreciated herefrom, the multi-stage orifice Pr employed in the shown embodiment serves to provide greater fluid flow restriction against non-steady or disturbed fluid flow than that for the steady flow. As seen from FIG. 2, the multi-stage orifice Pr is provided upstream of the upper and lower sections 42Uu and 42Ul. On the other hand, a fixed throttling orifice Pd is provided at an orientation downstream of the lower section 42Ul and upstream of the upper section 42Uu. Similarly, the pilot chamber PR is communicated with the supply port 54s via a pilot path PP. A multi-stage orifice Qp which has similar construction and flow restricting function to that of the multi-stage orifice Pr is provided in the pilot path PP.

A fixed throttle orifice Pro is also provided in the drain port 54r for restricting fluid flow therethrough. The diameter of the fluid path at the orifice Pro is so selected as to create great flow restriction against pulsatile fluid flow cyclically varying the fluid pressure at a frequency approximately 1 Hz.

Figure 4:
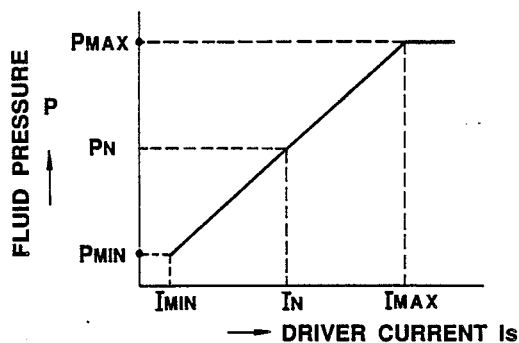
FIG. 4 is a chart showing relationship between an electric current value of a control signal to be supplied for an actuator of the pressure control valve and a working fluid pressure supplied to a working chamber of a hydraulic cylinder.

FIG. 4 shows variation of the working fluid pressure in the working chamber 26d of the hydraulic cylinder 26 according to variation of the current value of the control signal applied to the actuator 29 of the pressure control valve 28. As seen from FIG. 4, the hydraulic pressure in the working chamber 26d varies between a maximum pressure $P_{max}$ which is saturation pressure of the pressure source unit 16 and a minimum pressure $P_{min}$ which is set at a magnitude in view of a noise component to be contained in the control signal. As seen from FIG. 4, the maximum pressure $P_{max}$ corresponds to the maximum current value $I_{max}$ of the control signal and the minimum pressure $P_{min}$ corresponds to the minimum current value $I_{min}$ of the control signal. Furthermore, the hydraulic pressure level as labeled $P_n$ represents neutral pressure at the neutral current $I_n$. As seen, the neutral current $I_n$ is set at an intermediate value between the maximum and minimum current values $I_{max}$ and $I_{min}$.

As shown in FIG. 1, the pressure source unit includes the pressure unit 21 which comprises a fluid pump 16, and is connected to a fluid reservoir 16a via a suction pipe 201 The fluid pump 16 is associated with an automotive engine (not shown) so as to be driven by the output torque of the latter. The outlet of the fluid pump 16, through which the pressurized working fluid is discharged, is connected to the supply port 54s of the pressure control valve 28 via the supply line 35. A pressure regulating orifice may be disposed in the supply line 35 for suppressing pulsatile flow of the working fluid and whereby regulate the output pressure of the fluid pump 16 to be delivered to the pressure control valve 28. A feedback line 39 is connected to supply line 35 at one end. The other end of the feedback line 39 is connected to the return line 37 upstream of the fluid reservoir 16a. A pressure regulation valve 206 is disposed within the feedback line 39 so as to relief excessive fluid pressure to the fluid reservoir 16a.

An one-way check valve 204 is disposed in the supply line 35 at the position upstream of the junction between the pressure accumulator 18 and the supply line 35.

An operational check valve 211 is disposed in the drain line 37 for permitting fluid flow toward the fluid reservoir 16a only when the fluid pressure in the drain line 37 upstream thereof is higher than a pilot pressure. In the shown embodiment, the operational check valve 211 is connected to the supply line 35 at a position downstream of the one-way check valve 204 via a pilot line 208 so that the pilot pressure in the operational check valve is determined according to the fluid pressure in the supply line.

Here, the pressure relief valve 206 employed in the shown embodiment is set a set pressure at 100 kgf/cm². The pressure relief valve 206 relieves the fluid pressure in excess of the set pressure to return the fluid reservoir. On the other hand, in the shown embodiment, the operational check valve 211 is designed to pass the fluid flowing through the drain line 37 when the fluid pressure upstream thereof is higher than a predetermined neutral pressure $P_N$, e.g. 50 kgf/cm².

In the hydraulic circuit set forth above, the fluid is pump 16 is driven by the engine to discharge pressurized working fluid while the engine is running. The pressurized fluid discharged from the outlet of the fluid pump 16 is fed to the pressure control valve 28 via the supply line 35 including the one-way check valve 204. When the pressure control valve 28 is shifted to 54s and the pressure control port 54c from the valve position shown in FIG. 2, the pressurized working fluid passes the pressure control valve 28 and introduced into the working chamber 26d of the hydraulic cylinder 26. On the other hand, when the pressure control valve 28 is shifted to block fluid communication between the supply port 54s and the pressure control chamber PC, the fluid pressure in the supply line 35 increases. When the line pressure in the supply line 35 becomes higher than or equal to the set pressure of the pressure relief valve 206 in the pressure relief line 39, the excessive pressure is fed to the drain line 37 via the pressure relief valve 206 and thus returned to the reservoir tank 16a.

The fluid pressure in the supply line 35 is also fed to the pilot line 208. As set forth, the operational check valve is held open as long as the fluid pressure introduced through the drain line 37 is held higher than or equal to the pilot pressure. Therefore, fluid communication between the pressure control valve 28 and the reservoir tank 16a is maintained. At this position, the working fluid is thus returned to the reservoir tank 16a via the drain line 37 via the operational check valve 211.

Figure 3:
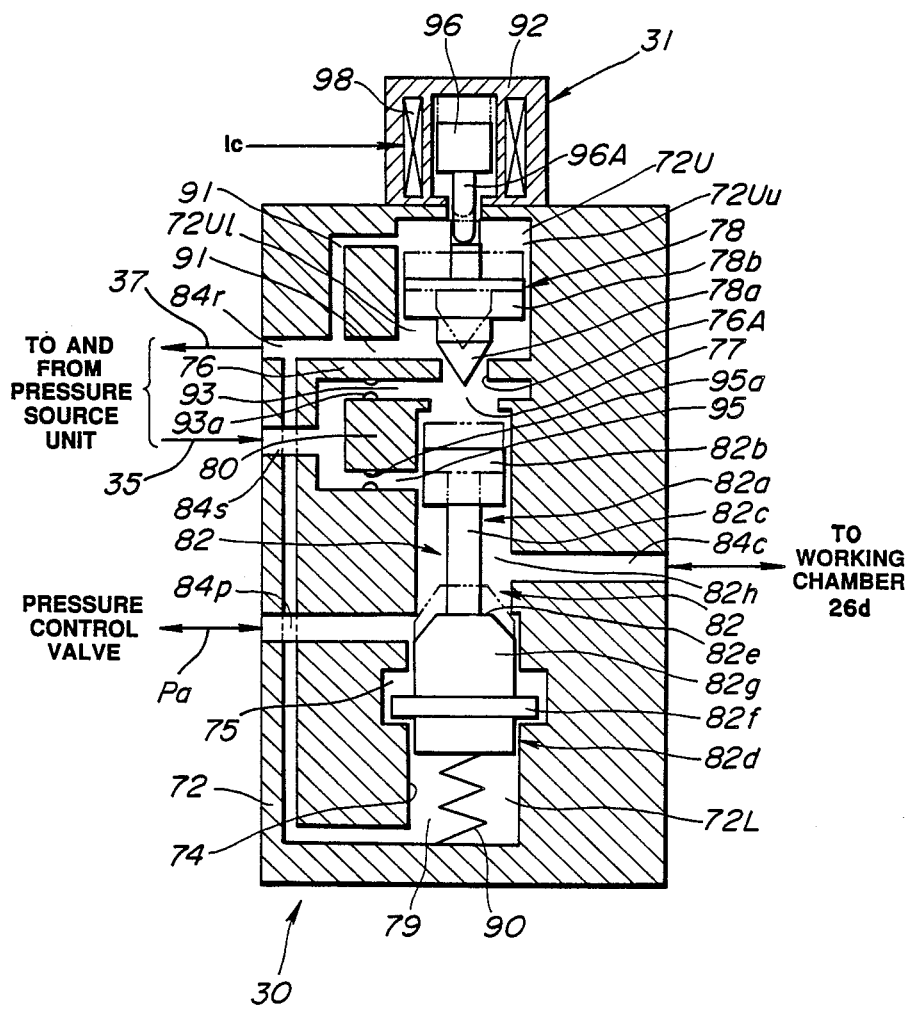
FIG. 3 is a sectional view of the preferred embodiment of a fail-safe valve according to the present invention.

As shown in FIG. 3 in detail, the fail-safe valve 30 comprises a two-way valve assembly and is designed to be controlled between open state and closed state by ON and OFF of a fail-safe control signal supplied from the control unit 22. Generally, the fail-safe valve 30 establishes and blocks fluid communication between the pressure control valve 28 and the working chamber 26d.

In the construction of the fail-safe valve shown in FIG. 3, the fail-safe valve 30 includes a valve housing 72. The valve housing 72 defines a valve bore 74 which is separated in to a valve chamber 72L and a control chamber 72U by means of a partitioning wall 76. The partitioning wall 76 is formed with a communication path opening 76A for communication between the control chamber 72U and the valve chamber 72L. As seen from FIG. 3, the control chamber 72U and the valve chamber 72L are arranged in alignment to each other across the communication path opening 76A. In parallel to a section of the partitioning wall 76 extending perpendicular to the axis of the valve chamber 72L and the control chamber 72U, a fixed orifice defining partitioning member 80 is provided. The partitioning member 80 defines a throttling orifice which is oriented substantially in alignment with the communication path opening 76A. The partitioning wall 76 and the partitioning member 80 are cooperative for defining a pilot chamber 77 therebetween.

A valve spool 82 is thrustingly and slidingly disposed within the valve chamber 72L. The valve spool 82 defines the pilot chamber 77 between the tip end thereof and the partitioning member 80. The valve spool 82 also defines a lower feedback chamber 79 between the other tip end thereof and the bottom of the valve chamber 72L. Return spring 90 is disposed within the lower feedback chamber 79, which return spring exerts spring force to the valve spool 82 for resiliently biasing the latter upwardly. The valve chamber 72L is communicated with the supply line 35 via a supply port 84s, the drain line 37 via a drain port 84r, the working chamber 26d via a control port 84c and the pressure control port 54c of the pressure control valve 28 via a communication port 84p. The supply port, drain port, control port and communication port are defined in the valve housing 72.

The valve spool 82 comprises a actuator spool 82a having a land 82b slidingly contact with the periphery of the valve bore and having a top surface subjecting the pilot pressure in the pilot chamber 77. The actuator spool 82a also has a push rod 82c integrally formed with the land 82b and extending downwardly therefrom. A piston valve 82d is formed separately from the actuator spool 82a. The piston valve 82d has top end surface 82e opposing to the lower end of the push rod 82c. The piston valve 82d has an annular projection 82f extending from the outer periphery of the main body 82g thereof and disposed within an annular groove 75 formed on the inner periphery of the valve bore 74. The lower end of the main body 82g of the piston valve 82d contacts with the return spring 90. Between the land 82b and the piston valve 82d, a pressure control chamber 82h is defined.

A poppet valve member 78 is disposed within the control chamber 72U for thrusting movement therein. The poppet valve member 78 has a valve head 78a of an essentially conical configuration. The valve head 78a opposes to the communication path opening 76A of the partitioning wall 76. The poppet valve member 78 is operably associated with a ON/OFF solenoid assembly 31 as the actuator. The ON/OFF solenoid assembly 31 comprises a housing 92 rigidly secured on the valve housing 72 and defining an internal space to receive therein a plunger 96. The plunger 96 has a plunger rod 96A. The tip end of the plunger rod 96A is kept in contact with the tip end of the poppet valve member 78 remote from the valve head 78a. Therefore, the poppet valve member 78 is axially driven by means of the plunger 96 to control the path area in the communication path opening 76A according to the position of the tip end of the plunger rod 96A. Adjusting of the path area in the communication path opening 76A results in variation of fluid pressure to be introduced into the pilot chamber 77.

In order to control the position of the plunger 96 with the plunger rod 96A, a solenoid coil 98 is housed within the housing 92 and surrounds the plunger 96. The solenoid coil 98 is connected to the control unit 22. The solenoid coil 98 is normally energized to push the poppet valve 78 to reduce the path area in the opening 76A to a substantially small area so as to substantially restrict fluid flow therethrough. As long as the line pressure supplied from the supply line 35 is maintained at height level, the actuator spool 82a is depressed downwardly to cause downward movement of the land 82b and the piston valve 82d. At this condition, the spool valve 82 is placed at a position illustrated by the solid line in FIG. 3 to establish fluid communication between the ports 84p and 84c and blocks fluid communication between the branch path 95 and the pressure control chamber 82h. At this condition, the fail-safe valve 30 serves as part of the pressure control line 38 to permit fluid flow between the pressure control valve 28 and the working chamber 26d. On the other hand, when the solenoid coil 98 is deenergized by interruption of power supply, the spool valve assembly 82 is shifted upwardly to the position as being illustrated by the phantom line in FIG. 3, by the return spring 90. At this position, the piston valve 82d blocks the communication port 84p from the pressure control chamber 82h and establish fluid communication between the branch path 95 and the pressure control port 84c via the pressure control chamber 82h.

As seen from FIG. 3, the poppet valve member 78 has a cylindrical larger diameter section 78b for separating the control chamber 72U into upper section and lower section 72Uu and 72Ul. The upper and lower sections 72Uu and 72Ul are communicated with the drain port 84r via a pilot return path 91. On the other hand, the pilot chamber 77 is communicated with the supply port 84s via a pilot path 93 with an orifice 93a. The pilot path 93 has a branch path 95 with a flow restricting orifice 95a. The branch path 95 opens to the pressure control chamber 82h when the spool valve 82 is shifted upwardly as shown by phantom line in FIG. 3.

In the shown embodiment, the solenoid coil 98 is maintained energized as long as power supply for the control unit 22 is maintained. The solenoid coil 98 as energized drives the plunger 96 to drive the poppet valve 78 via the plunger rod 96A downwardly to place the latter at the position as illustrated by the solid line in FIG. 3. The valve head 78a thus enters into the opening 76a to restrict fluid flow from the pilot chamber 77 to the upper control chamber 72U. Restriction magnitude of the fluid flow at this valve position is substantial to increase the pilot pressure in the pilot chamber 77 toward the line pressure in the supply line 35 which is introduced through the supply port 84s. Increased pilot pressure in the pilot chamber 77 overcomes the spring force exerted to the spool valve assembly 82 by the return spring 90 to cause downward shifting to the position as illustrated by solid line in FIG. 3. As a result, the communication port 84p is communicated with the pressure control port 84c via the pressure control chamber 82h to permit fluid flow between the pressure control valve 28 and the working chamber 26d therethrough.

As will be appreciated herefrom, at this valve position, the fail-safe valve 30 serves as part of the pressure control line 38.

On the other hand, when the power supply is interrupted, the solenoid coil 98 is deenergized, to make the poppet valve free from the downward force. Therefore, the poppet valve 78 is shifted upwardly by the fluid pressure difference between the pilot chamber 77 and the lower section 72Ul of the control chamber 72U. This widens the path area of the opening 76A to permit greater amount of working fluid to circulate the working fluid through the drain port 84d to the drain line 37. Therefore, the pilot pressure in the pilot chamber 77 is thus reduced to permit upward shifting of the valve spool assembly 82 by the spring force of the return spring 90. By this, the valve spool assembly 82 is shifted upwardly to the position as illustrated by the phantom line in FIG. 3. As seen from FIG. 3, upward shift of the valve spool assembly 82 causes blocking of the communication port 84p by the piston valve 82d for blocking fluid communication between the pressure control valve 28 and the working chamber 26d. On the other hand, the upward shifting of the valve spool assembly 82 causes opening of the branch path 95 to the pressure control chamber 82h to establish fluid communication between the supply line 35 and the working chamber 26d by-passing the pressure control valve 28.

Figure 5:
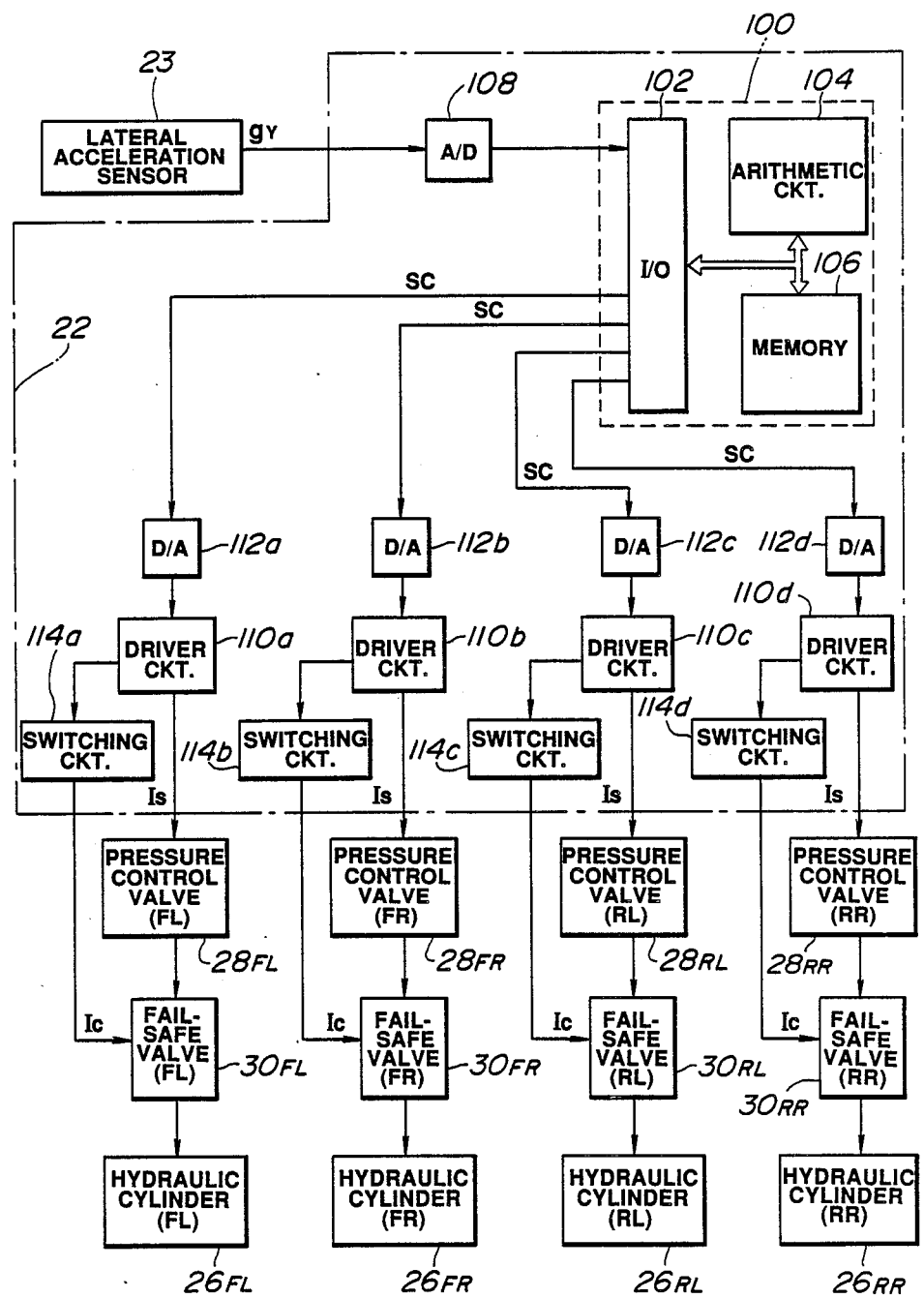
FIG. 5 is a block diagram of an electric suspension control system incorporating a control unit employed in the preferred embodiment of the actively controlled suspension system of FIG. 1.

FIG. 5 shows a block diagram of a control circuit performing active suspension control. The control circuit include the control unit 22 which comprises a microprocessor 100 including an input/output interface (I/O) 102, an arithmetic circuit 104 and a memory unit 106. The lateral acceleration sensor 23 is connected to the input/output interface 102 via an analog-to-digital (A/D) converter 108. The input/output interface 102 is also connected to driver circuits 110a, 110b, 110c and 110d via digital-to-analog (D/A) converters 112a, 112b, 112c and 112d. The D/A converters 112a, 112b, 112c and 112d convert the digital control signals representative of desired fluid pressures in respective hydraulic cylinders 26FL, 26FR, 26RL and 26RR into analog signals indicative of respective control values. The driver circuits 110a, 110b, 110c and 110d generates control currents to be supplied for respective proportioning solenoid coils 68 of the pressure control valves 28FL, 28FR, 28RL and 28RR.

Figure 6:
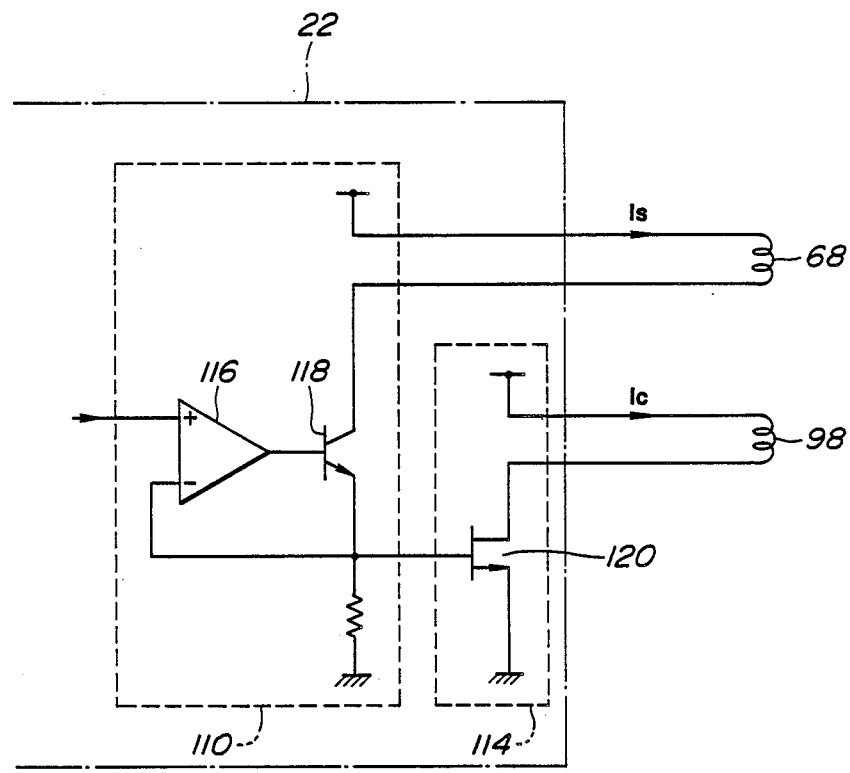
FIG. 6 is a circuit diagram of a switching circuit for selectively driving one of the pressure control valve of FIG. 2 and the fail-safe valve of FIG. 3.

Switching circuits 114a, 114b, 114c and 114d are connected to the driver circuits 110a, 110b, 110c and 110d. The preferred construction of the driver circuit which is generally represented by the reference numeral "110" and the switching circuit which is generally represented by the reference numeral "114" are illustrated in FIG. 6. As seen from FIG. 6, the driver circuit 110 comprises a operational amplifier 116 having a non-inverting input terminal connected to the associated one of the D/A converter which is generally represented by the reference numeral "112" to receive therefrom the converted analog form control signal. The operational amplifier 116 has an inverting input terminal connected to the emitter electrode of a transistor 118 which has the base electrode connected to the output terminal of the operational amplifier 116. The collector electrode of the transistor 118 is connected to a power source via the solenoid coil 68 of the proportioning actuator 29 of the pressure control valve 28.

The operational amplifier 116 varies output value depending upon the difference of the control signal value and the feedback value fed back from the emitter electrode of the transistor 118. The transistor 118 varies conductivity for adjusting the current flowing through the solenoid coil 68.

On the other hand, the emitter electrode of the transistor 118 is also connected to a field effect transistor (FET) 120 providing a predetermined ON bias. The FET 120 is held conductive to permit current flow while the input for the source region thereof from the emitter electrode of the transistor 118 is held higher than or equal to the ON bias. Since the solenoid coil 98 of the ON/OFF solenoid 31 is interposed between the power source and the FET 120, it is held energized state while the potential at the emitter electrode is held higher than or equal to the ON bias.

As will be appreciated, the bias level of the FET 120 is set at a value which may not occur while the control circuit is in operation in the normal state. On the other hand, when power supply for the driver circuit from the power source is interrupted due to breakage of the lead wire or due to malfunction of the microprocessor, then the input level at the FET 120 drops down to the bias level. As a result, the FET 120 becomes non-conductive to prevent the current to flow therethrough. Therefore, the solenoid coil 98 is deenergized.

Operation of the aforementioned pressure control valve 28 in terms of control of suspension characteristics and absorption of road shock while the control system operates in normal condition, will be discussed hereinbelow.

In general, the pressurized working fluid source unit 16 supplies the predetermined line pressure. For example, the line pressure in the supply line 35 may be set at a pressure of 100 kgf/cm² which corresponds to the set pressure of the pressure relief valve 206.

When the vehicle steadily travels on a smooth straight road, the current value of the control signal to be applied to the actuator 29 of the pressure control valve 28 is maintained at the neutral value $I_n$. As long as the neutral value $I_n$ of the control signal is applied to the actuator 29, the proportioning solenoid coil 68 is energized at a magnitude corresponding the neutral value $I_n$ of the control signal to place the poppet valve 48 at the corresponding position. At this position, the flow resistance at the communication path opening 46A, path area of which is restricted by the valve head 48a of the poppet valve 48 becomes the neutral value. At this position of the poppet valve 48, the pilot pressure $P_p$ within the pilot chamber PR is maintained at the neutral pressure $P_n$. At this condition, if the fluid pressures is the control pressure Pc in the pressure control port 54c is held equal to the fluid pressure in the working chamber 26d of the hydraulic cylinder 26, the fluid pressure in the upper and lower feedback chambers FU and FL are held in balance to each other. The valve spool 52 is maintained at the neutral position to shut fluid communication between the supply port 54s, the drain port 54r and the pressure control port 54c. Therefore, the control pressure Pc is maintained at the neutral pressure $P_n$.

At this condition, when relatively high frequency and small magnitude road shock input through the vehicular wheel, is absorbed by fluid communication between the working chamber 26d and the pressure accumulator 34 via the orifice 32. The flow restriction in the orifice 32 serves to absorb the bounding and rebounding energy. Therefore, high frequency and small magnitude road shock can be effectively absorbed so as not to be transmitted to the vehicle body.

When the piston 26c strokes in rebounding direction compressing the working chamber 26d, the fluid pressure in the working chamber increases to increase the control pressure Pc in the pressure control port 54c. Therefore, the control pressure Pc becomes higher than the pilot pressure $P_p$ in the pilot chamber PR. This results in increasing of the fluid pressure in the lower feedback chamber FL at a magnitude higher than that in the upper feedback chamber FU. This causes upward movement of the valve spool 52 to establish fluid communication between the drain port 54r and the pressure control port 54c. Therefore, the pressure in the pressure control port 54c is drained through the drain line 37. This causes pressure drop at the pressure control port 54c so that the control pressure Pc becomes lower than the pilot pressure $P_p$ in the pilot chamber PR. Then, the fluid pressure in the upper feedback chamber FU becomes higher than that in the lower feedback chamber FL. Therefore, the valve spool 52 is shifted downwardly to establish fluid communication between the supply port 54s and the pressure control port 54c. The pressurized working fluid in the supply line 35 is thus supplied to the working chamber 26d via the pressure control port 54c to increase the fluid pressure. By repeating the foregoing cycles, pressure balance is established between the pressure control port 54c and the pilot chamber PR. Therefore, the control pressure Pc as well as the fluid pressure in the working chamber 26d are adjusted to the pilot pressure.

During the pressure adjusting operation set forth above, the fixed throttling orifice Pro serves for restricting fluid flow from the pressure control port 54c to the drain line 37. This flow restriction at the orifice Pro serves as resistance against the rebounding stroke of the piston 26c to damp or absorb energy causing rebounding motion of the vehicle body. Furthermore, as set out, working fluid in the pilot chamber PR is generally introduced through the pilot path PP via the multi-stage orifice Qp and return through the pilot return path PT via the lower section 42Ul of the control chamber 42U and via the multi-stage orifice Pr. As long as the fluid flow in the pilot return path PT is not disturbed and thus steady. The most upstream side orifice Pr' is mainly effective for restricting the fluid flow. Therefore, magnitude of flow restriction is relatively small so as to provide sufficient response characteristics in reduction of the pilot pressure. On the other hand, when the working fluid flowing from the control chamber 42U confluence with the working fluid from the pilot chamber PR, back pressure is produced in the drain port 54r, the fluid flowing through the pilot return path PT is disturbed and thus becomes unstable. This tends to cause serving of the pressurized fluid from the drain port 54r to the pilot chamber PR. In such case, all of the orifices in the multi-stage orifice Pr is effective to create greater flow restriction that than for the steady flow. This avoid influence of the back pressure created in the drain port 54r.

Similarly, in response to the bounding stroke of the piston 26c, the valve spool 52 is shifted up and down to absorb bounding energy and maintains the fluid pressure in the working chamber 26d of the hydraulic cylinder 26 at the neutral pressure.

Figure 7:
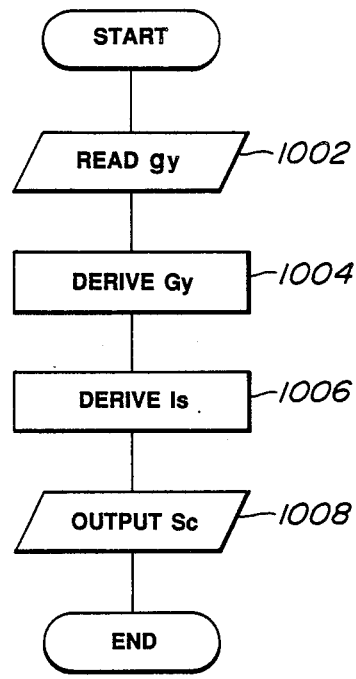
FIG. 7 is a flowchart of anti-rolling suspension control program to be executed in a microprocessor employed in the control unit of FIG. 5.

On the other hand, in order to suppress vehicular rolling motion, anti-rolling suspension control program as illustrated in FIG. 7 is executed. The shown program is executed periodically with a given interval, e.g. 20 ms. Immediately after starting execution, the lateral acceleration indicative signal value $g_y$ is read out at a step 1002. At a step 1004, a lateral acceleration data $G_y$ is derived on the basis of the read out lateral acceleration indicative signal value $g_y$. An anti-rolling suspension control signal value Is is then derived by multiplying the lateral acceleration data $G_y$ by a predetermined anti-rolling coefficient $K_y$ which defines response characteristics of anti-rolling suspension control, at a step 1006. Such anti-rolling suspension controls have been disclosed in the co-pending U.S. patent applications Ser. Nos. 176,246 and 172,419 respectively filed on Mar. 31, 1988 and Mar. 24, 1988, and both being commonly assigned to the assignee of the present invention, and the corresponding European patent applications have been already published as European Patent First Publication Nos. 02 85 153 and 02 84 053. Disclosure of these prior applications will be herein incorporated by reference for the sake of disclosure.

Based on the anti-rolling suspension control signal values Is derived at the step 1006, a control signal Sc is derived and output at a step 1008.

In the practical control, when the anti-rolling suspension control is taken place in response to the lateral acceleration exerted on the vehicle body, the control signal current value is derived on the basis of the magnitude of the lateral acceleration monitored by the lateral acceleration sensor 23. Generally, in order to suppress rolling motion of the vehicular body, the fluid pressure in the working chamber 26d of the hydraulic cylinder 26 which is provided for the suspension mechanism at the side where the vehicular height is lowered across the neutral position, is increased to suppress lowering motion of the vehicle body. On the other hand, the fluid pressure in the working chamber 26d of the hydraulic cylinder 26 which is provided for the suspension mechanism at the side where the vehicular height is risen across the neutral position, is decreased to suppress rising motion of the vehicle body. Therefore, in order to control the pressures in the working chambers 26d of the both side hydraulic cylinders 26, control signal current values are increased and creased across the neutral value $I_n$.

For example, when rolling motion is caused by left turn of the vehicle, control current for the actuators 29 of the pressure control valves 28 controlling the fluid pressures in the front-right and rear-right hydraulic cylinders 26FR and 26RR are to be increased to be greater than the neutral current $I_n$, and the control current for the actuator of the pressure control valves 28 controlling the fluid pressures in the front-left and rear-left hydraulic cylinders 26FL and 26RL are to be decreased to be smaller than the neutral current $I_n$. By the control current supplied to respective actuators 29, the proportioning solenoid coils 68 are energized at the magnitudes corresponding to the control signal currents to place the poppet valves 48 at respective corresponding positions. By variation of the positions of the poppet valves 48, flow restriction magnitude at respective communication path openings 46A is varied to vary the pilot pressures $P_p$ in the pilot chamber PR. As set forth, since the fluid pressures in the working chambers 26d become equal to the pilot pressures $P_p$, the suspension characteristics at respective hydraulic cylinders 26 can be adjusted.

If breakage of wiring or malfunction of the control system occurs, the fail-safe valve 30 is operated from the normal mode position as illustrated by the solid line in FIG. 3 to the fail-safe mode position which is illustrated by phantom line. At the fail-safe mode position of the fail-safe valve 30, the pressure control valve 28 is blocked from fluid communication with the working chamber 26d. On the other hand, the fail-safe valve 30 establishes direct fluid communication between the working chamber 26d and the supply and drain lines 35 and 37. At this time, since the one-way check valve 204 in the supply line 35 prevents the surge flow of the working fluid and the operational check valve 211 maintains the fluid pressure in the drain line 37 at the higher than the neutral pressure $P_N$, the line pressure in the entire circuit of the supply line 35, the fail-safe valve 30, working chamber 26d, the fail-safe valve 30, drain line 37 and the operational check valve 211 is held at the neutral pressure $P_N$.

Therefore, even when failure of the control circuit occurs, the suspension characteristics of respective suspension system can be held at neutral condition by setting the fluid pressure in the hydraulic cylinder at the neutral pressure. Therefore, safety can be assured.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

Furthermore, though the shown embodiment of the proportioning valve assembly has been disclosed in terms of the hydraulic suspension system, it may be applicable for any fluid systems, such as pnuematic system, hydropneumatic system and so forth.

What is claimed is:

1. A control system for controlling suspension characteristics in an automotive suspension system, comprising:
   a cylinder disposed between a vehicle body and a suspension member which rotatably support a road wheel, said cylinder defining a variable pressure working chamber filled with a pressure medium for generating a damping force resisting against relative displacement between said vehicle body and said suspension member;
   a fluid circuit means connected to said working chamber for supplying pressure medium fluid and including a pressure source feeding pressurized pressure medium fluid through said circuit;
   a pressure control valve disposed between said pressure source and said working chamber and variable of valve position between a first mode for increasing the pressure of said pressure medium within said working chamber, a second mode for decreasing pressure in said pressure within said working source, and a third mode for maintaining said pressure in said pressure medium constant;
   a sensor means for monitoring vehicle body attitude change for producing a vehicle body attitude change indicative sensor signal;
   a control circuit for deriving a control signal on the basis of said vehicle body attitude change indicative signal for operating said pressure control valve to one of said first, second and third mode to adjust the pressure of said pressure medium in said working chamber for suppressing attitude change of the vehicle body;
   a detector means for detecting said control circuit in failure to produce a fail detection signal; and
   a fail-safe means responsive to said fail detection signal for adjusting the fluid pressure in said working chamber irrespective of the position of said pressure control valve means.

2. An actively controlled suspension system as set forth in claim 1, wherein said fluid circuit means comprises a supply line for supplying said pressurized pressure medium fluid, a drain line for recirculating said pressure medium fluid to a pressure source and a pressure control line connecting said pressure control valve means and said working fluid, and said fail-safe means includes means for setting line pressure in said drain line at a pressure higher than or equal to a predetermined pressure level.

3. An actively controlled suspension system as set forth in claim 2, wherein said line pressure setting means provides said predetermined pressure level at a pressure corresponding to a predetermined neutral pressure in said working chamber, at which neutral suspension characteristics are obtained.

4. An actively controlled suspension system as set forth in claim 2, wherein said fail-safe means comprises a first fluid path means which is normally active for serving as part of said pressure control line and a second fluid path means by-passing said pressure control line and directly connecting said working chamber to supply and drain lines while said fail detection signal is present.

5. An actively controlled suspension system as set forth in claim 4, wherein said fail-safe means includes means for switching between a first normal mode, in which said first path means is active, and a second fail-safe mode, in which said second path means is active, said switching means normally selecting said first normal mode and responsive to said fail detection signal to select said second fail-safe mode.

6. An actively controlled suspension system as set forth in claim 4, wherein said detector means monitors the value of said control signal applied to said pressure control valve means to detect said control signal value smaller than a given value to produce said fail detection signal.

7. A control system for controlling suspension characteristics in an automotive suspension system, comprising:
   a cylinder disposed between a vehicle body and a suspension member which rotatably support a road wheel, said cylinder defining a variable pressure working chamber filled with a pressure medium for generating a damping force resisting against relative displacement between said vehicle body and said suspension member;
   a fluid circuit means connected to said working chamber for supplying pressure medium fluid and including a pressure source feeding pressurized pressure medium fluid through said circuit;
   a pressure control valve disposed between said pressure source and said working chamber and variable of valve position between a first mode for increasing the pressure of said pressure medium within said working chamber, a second mode for decreasing pressure in said pressure within said working source, and a third mode for maintaining said pressure in said pressure medium constant;
   a sensor means for monitoring vehicle body attitude change for producing a vehicle body attitude change indicative sensor signal;
   a control circuit for deriving a control signal on the basis of said vehicle body attitude change indicative signal for operating said pressure control valve to one of said first, second and third mode to adjust the pressure of said pressure medium in said working chamber for suppressing attitude change of the vehicle body;
   a detector means for detecting said control signal having a value smaller than a given value to produce a fail detection signal; and
   a fail-safe means, including fluid path means by-passing said pressure control valve means and a fail-safe valve, for normally establishing fluid communication between said pressure control valve means and said working chamber and responsive to said fail detection signal for blocking fluid communication between said pressure control valve and said working chamber and establishing fluid communication between said working chamber and said fluid path means by-passing said pressure control valve means.

8. An actively controlled suspension system as set forth in claim 7, wherein said fail-safe valve comprises a two way valve including an electromagnetic actuator operable between a first energized state and a second deenergized state for operating said fail-safe valve between a first mode, in which fluid communication between said pressure control valve and said working chamber is established and fluid communication between between said working chamber and said fluid path means is blocked, and a second mode, in which fluid communication between said pressure control valve and said working chamber is blocked and fluid communication between said fluid path means and said working chamber is established.

9. An actively controlled suspension system as set forth in claim 8, wherein said fail-safe valve comprises:

a valve housing defining a first port connected to a pressurized working fluid source to receive pressurized working fluid therefrom, a second port connected to said pressurized working fluid source for returning working fluid thereto, a third port connected to said pressure control valve means, and a fourth port connected to said working chamber for fluid communication therewith for adjusting working fluid pressure in said working chamber;

a first valve body having one end facing a first chamber to be subject to a pilot pressure representative of a desired pressure in said working chamber and the other end facing a second chamber to be subject to a feedback pressure which is fed back from said third port, said first valve body being movable between a first position corresponding to said first mode and at which fluid communication between said pressure control valve and said working chamber is established and fluid communication between said working chamber and said fluid path means is blocked, and a second position corresponding to said second mode and at which fluid communication between said pressure control valve and said working chamber is blocked and fluid communication between said fluid path means and said working chamber is established, said first valve body being normally biased toward said second position with a given force;

a fluid path defining a fluid path extending from said first port to said first chamber and from said first chamber to said second port;

a second valve associated with said fluid path and movable between a first position for providing flow restriction at a predetermined first magnitude for generating pilot pressure overcoming said given force and a second position for providing flow restriction at a predetermined second magnitude for generating pilot pressure which is smaller than said given force; and an electrically operable actuator associated with said second valve normally positioning said valve body at said first position and responsive to said fail detection signal for driving said valve body to said second position.

10. An actively controlled suspension system as set forth in claim 9, wherein said fluid circuit means comprises a supply line for supplying said pressurized pressure medium fluid, a drain line for recirculating said pressure medium fluid to a pressure source and a pressure control line connecting said pressure control valve means and said working fluid, and said fail-safe means includes means for setting the line pressure in said drain line at a pressure higher than or equal to a predetermined pressure level.

11. An actively controlled suspension system as set forth in claim 10, wherein said line pressure setting means provides said predetermined pressure level at a pressure corresponding to a predetermined neutral pressure in said working chamber, at which neutral suspension characteristics are obtained.

12. An actively controlled suspension system as set forth in claim 7, wherein said detector means monitors the value of said control signal applied to said pressure control valve means to detect said control signal value smaller than a given value to produce said fail detection signal.

* * * * *